Dec. 13, 1966　　　J. G. LEPISTO　　　3,291,375
MULTI-PLY BAG

Filed May 11, 1965　　　　　　　　　　6 Sheets-Sheet 1

Dec. 13, 1966  J. G. LEPISTO  3,291,375
MULTI-PLY BAG
Filed May 11, 1965  6 Sheets-Sheet 3
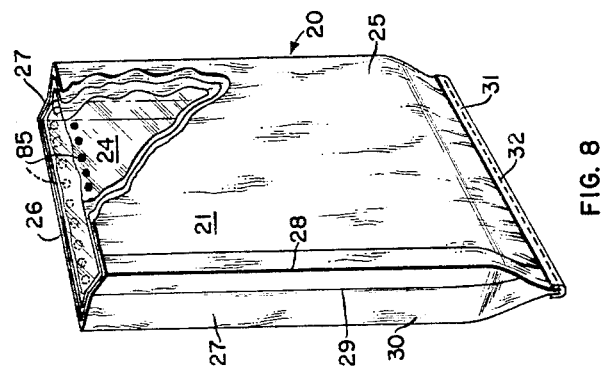
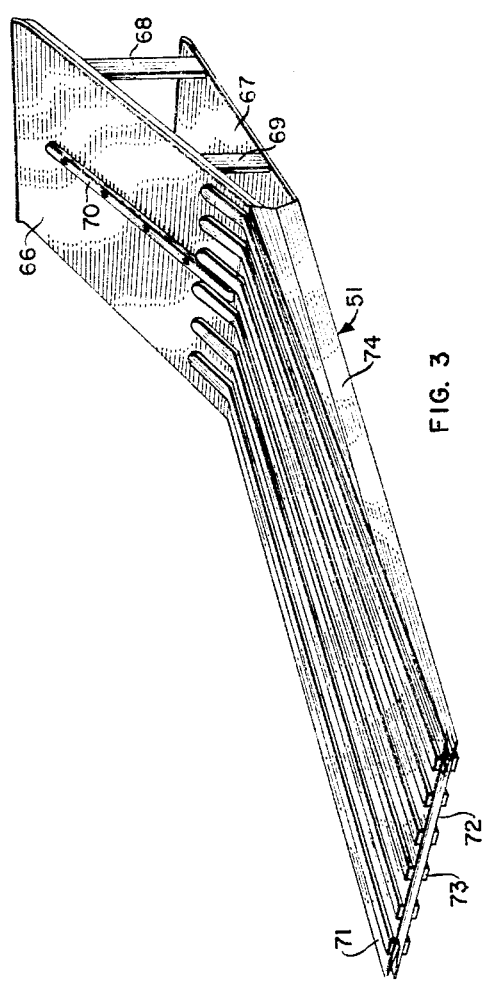

Dec. 13, 1966    J. G. LEPISTO    3,291,375
MULTI-PLY BAG
Filed May 11, 1965    6 Sheets-Sheet 4
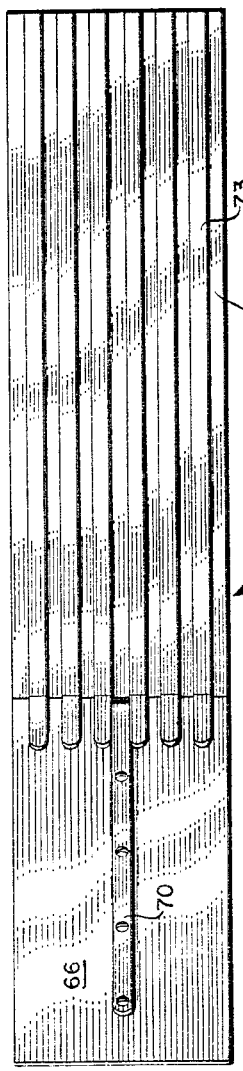
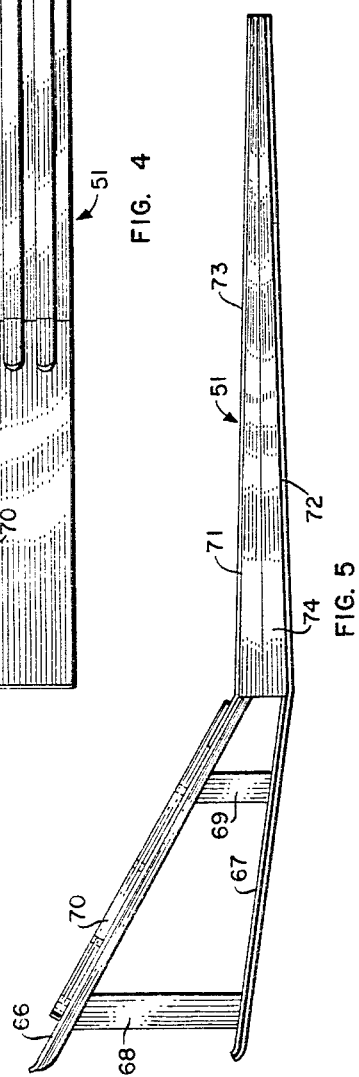
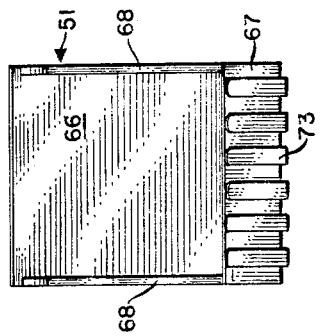
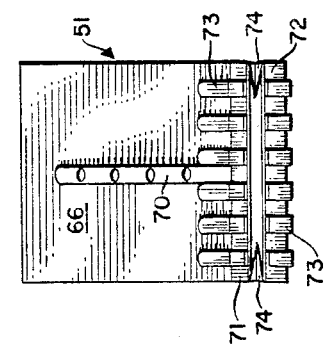

Dec. 13, 1966  J. G. LEPISTO  3,291,375
MULTI-PLY BAG
Filed May 11, 1965  6 Sheets-Sheet 5
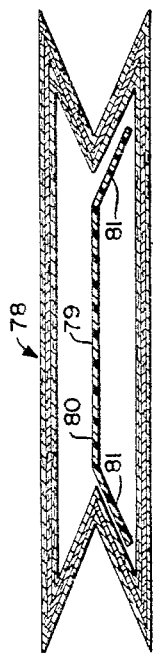
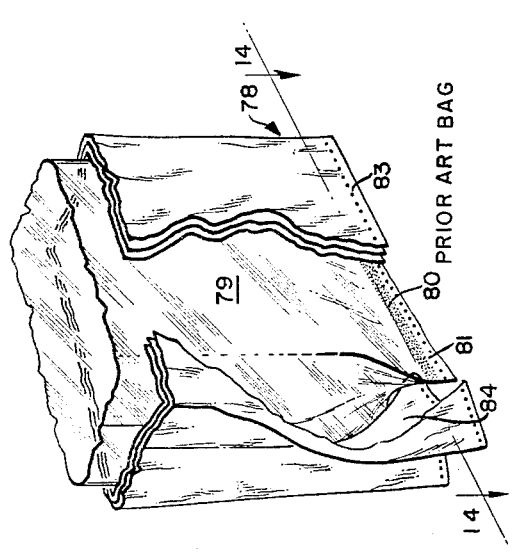
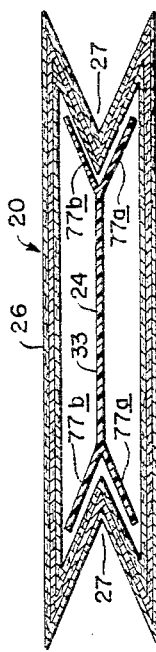
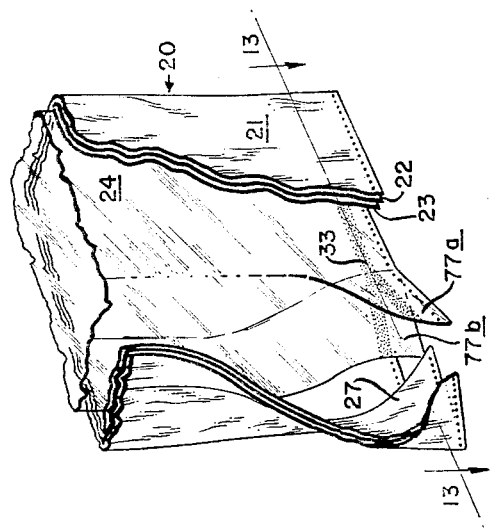

Dec. 13, 1966    J. G. LEPISTO    3,291,375
MULTI-PLY BAG

Filed May 11, 1965    6 Sheets-Sheet 6

3,291,375
MULTI-PLY BAG
John G. Lepisto, Middletown, Ohio, assignor to Albemarle Paper Manufacturing Company, Richmond, Va., a corporation of Virginia
Filed May 11, 1965, Ser. No 454,903
5 Claims. (Cl. 229—55)

This invention relates to a multi-ply bag, to a process and to an apparatus for manufacturing the bag. More specifically, the invention relates to a gusseted multi-ply bag having a gusseted plastic inner ply.

Gusseted paper bags have an advantage over flat tubular non-gusseted bags in that the gusseted bags present a generally rectangular package when they are filled with particulate material. This permits the gusseted bag to stack in more uniform flat fashion, which is a particular advantage in moving stacks of bags about on hand trucks or on pallets using mechanical trucks. The gusseted bags are far less prone to slip off one another than are the tube bags. Gusseted bags have an additional advantage in that they provide a visible edge portion which may be used for identification of filled stacked printed bags. Flat tube bags do not provide an edge portion suitable for ready identification by printing.

Heretofore, gusseted paper bags having a tubular free film plastic inner liner have been produced using a number of different techniques. One procedure used in manufacturing a gusseted multi-wall bag having a tubular plastic inner liner uses a flat sheet of plastic material, such as polyethylene which is run as the inner ply on a conventional multi-ply tubing machine (for example, see U.S. Patent 2,256,506). The infolded marginal edges of the plastic material must be sealed either by adhesive or heat sealing to provide a longitudinal seal extending the length of the inner ply of the bag. Quite often the welds are incomplete thus allowing bags to be produced which do not have a hermetic seal along the longitudinal seam. Further, it is difficult to obtain high speeds on the tubing machine when a heat seal must be applied to the plastic inner ply. When manufacturing plastic lined bags by this technique, the polyethylene sheet is in substantially full contact with the lower surface of the tube forming mandrel when the paper plies of the bag and the polyethylene sheet are being infolded to form nested tubes. Attempts to run the tubing machine at speeds conventionally used for multi-ply bags for paper inner liners often results in tearing and perforating the polyethylene inner ply as it moves across the mandrel. Friction between the mandrel surface and the polyethylene sheet produces a heat build-up that can cause the polyethylene sheet to weld to the surface of the former, thereby producing tears in the polyethylene inner ply. Attempts to eliminate this problem by using heavier gauge polyethylene sheet material has in the main been unsuccessful. Even if the tubing machine is run at a low enough speed to prevent friction build-up, the edges of the former usually produce scoring in the gusset portion of the bag along the lines where the web is infolded to form the gussets. The polyethylene inner liner is either broken or severely weakened along these crease lines and the bags manufactured thus do not provide the desired moisture and grease barriers. Multi-wall bags prepared from flat sheet polyethylene suffer an additional disadvantage in that they often contain small particles of fiber from the paper webs within the interior of the plastic inner ply. This is produced by fiber pick-up during the handling and running of the webs through the tube forming machine. Such contamination has been a problem when the plastic lined bags are used for materials such as polyethylene, polyvinyl chloride and other plastic packaging. The fiber contaminates the plastic and produces off-specification film and other articles manufactured from the plastic.

A second technique that has been used for producing multi-ply gusseted bags with a tubular plastic inner liner is to run a flat, non-gusseted, seamless tube of plastic material as the inner ply on a conventional tubing machine. The flattened tube is passed underneath and in contact with the bottom surface of the former about which the multi-ply paper tubes are infolded. In this method of manufacture, the folded edge portions of the plastic tube are subjected to high pressures from the tension applied to the paper webs and often crack or weaken the tube along the crease line. When bag lengths are cut from the tubed paper stock and the bag bottom is sewn, the plastic inner liner is enveloped in either the front or the back gusset folds on the bag. When the bag is filled with a particulate material, it is necessary for the free film plastic inner liner to fold across and form to the contour of the bottom portion of the bag in the gusseted area. Thus the plastic liner is not fully supported on its entire surface by the outer paper plies and produces a wear point which tends to weaken the plastic inner ply when the bag is transported or handled.

The third technique utilized in producing multi-ply gusseted bags having tubular plastic inner liners is to position pre-formed plastic inner liners which have a sealed end inside a pre-formed paper multi-ply gusseted bag. This operation heretofore has been conducted primarily by hand, thus very low production rates are achieved and consequently costs are high. Mechanical liner inserting apparatus has been developed in an effort to speed up the insertion of pre-formed liners (see U.S. Patent 2,896,516). This type bag construction produces problems in that either one or both ends of the plastic inner liner is not attached to the paper plies at the end of the bag. This permits the inner liner to shift position inside the paper ply to cause an uneven shaped package. Also, the liner often is dumped out with the product when the bag is emptied causing contamination of the product.

From the foregoing, it can be seen that the bag making industry has need for a seamless plastic lined gusseted bag length which can be produced on conventional tubing machines with minor modifications and high production rates. Such bag lengths can be sewn, glued, heat sealed, or sealed by other means on one or both ends to form a gusseted bag having a plastic inner liner with high resistance to cracking on the fold lines forming the gussets. Additionally, there is a need for a multi-ply gusseted bag having a seamless gusseted plastic inner liner which has an end seal that permits full conformance of the plastic inner liner to the shape of the paper outer plies.

Therefore, it is an object of this invention to provide a gusseted multi-ply bag having a seamless gusseted plastic inner liner, which bag can be produced economically.

Another object of this invention is to provide a gusseted multi-ply bag having seamless gusseted plastic inner liner, which bag has a novel heat seal that permits the bag to fully follow the contours of the gussets in the paper outer plies.

A further object of this invention is to provide a gusseted multi-ply bag length having a gusseted seamless plastic inner liner, which inner liner has uniform strength throughout the surface of the inner plastic ply.

A still further object of this invention is to provide a gusseted multi-ply bag having a gusseted seamless plastic inner liner, which bag is free from contaminating material within the interior of the plastic inner ply.

A still further object of this invention is to provide a gusseted multi-ply bag having a gusseted seamless plastic inner liner, which bag has a heat seal that may be applied conveniently through the paper plies after the bag has been closed on one end.

An additional object of this invention is to provide a method for producing a gusseted multi-ply bag having a gusseted seamless plastic inner liner, which process will produce bags at high speed.

An additional object of this invention is to provide a novel apparatus for forming gusseted multi-ply bags having a gusseted seamless plastic inner liner.

An additional object of this invention is to provide a novel mandrel for a bag forming apparatus.

The gusseted multi-ply bag length of the present invention includes an outer ply of sheet material in the form of a flattened tube having a front and back surface. The flattened tube has longitudinally extending, spaced apart fold lines on each side thereof along which the side portions of said tube are infolded to provide at least one generally V-shaped gusset in each of the side portions of the tube. An inner, seamless tubular ply of plastic material is received in and conforms to the shape of the outer ply. The inner, seamless tubular ply of plastic material has fold lines in the side portions thereof corresponding to those in said flattened tube. The inner ply of plastic material has substantially the same resistance to cracking along the fold lines in the side portions thereof as does the unfolded front and back portions of the inner ply.

The gusseted multi-ply bag of the present invention includes an outer ply of sheet material in the form of a flattened tube having a front and back surface. The flattened tube is provided with infolded portions at each side thereof constituting gussets. An inner tubular ply of seamless plastic material is received and conforms to the shape of the outer ply. The inner tubular ply of seamless plastic material is transversely sealed adjacent one end thereof. The seal extends along the double fold portion at each side thereof where the plastic inner ply extends into the gussets of the paper outer ply. This provides a seal having a cross-sectional shape of a Y at each side portion. Means are provided for closing the end of the bag which has the seal.

The process of the present invention for forming a gusseted multi-ply bag includes the steps of advancing a web of sheet material adapted to be formed into the outer ply of the bag. A thin-walled tube of plastic material adapted to be formed into a plastic inner liner of the bag is advanced coextensively with the web of sheet material. A portion of the tube of plastic material is maintained in an inflated state using a gas. The inflated portion of the tube of plastic material is partially flattened and gussets are formed in the sides thereof. The web of sheet material is infolded around the tube of plastic material to form a partially flattened tube. Gussets are formed in the sides of the partially flattened tube of sheet material while maintaining separation between the tube of sheet material and the tube of plastic material. The gussets in the tube of sheet material register with the gussets in the tube of plastic material. Finally, the gusseted tube of sheet material and gusseted tube of plastic material contained within the tube of sheet material is flattened into a length of bag-forming stock.

The apparatus aspect of the present invention is exemplified by an apparatus for forming gusseted multi-ply bags which includes means for transporting at least one web of sheet material from a supply roll through the apparatus. Means for transporting a thin-walled tube of plastic material from a supply roll through the apparatus is provided. This transporting means also includes air entrapment means to maintain a portion of the tube of plastic material inflated. Means for forming the web of sheet material and the tube of plastic material into a length of tubular multi-wall bag stock is provided, the forming means having a portion adapted to receive interiorly the inflated tube of plastic material to fold gussets into the tube. The forming means also has a portion adapted to receive the web of sheet material exteriorly to form the sheet into a tube provided with gussets matching those formed in the tube of plastic material.

The foregoing, and other objects, features and advantages of the present invention will be apparent from a consideration of the following specification taken in conjunction with the accompanying drawings in which like reference characters designate the same or similar parts throughout the several views.

In the drawings:

FIGURE 3 is a perspective view of a bag-forming mandrel constructed in accordance with the present invention;

FIGURE 4 is a plan view of the mandrel shown in FIGURE 3;

FIGURE 5 is a side view of FIGURE 4;

FIGURE 6 is a right hand end view of the mandrel as shown in FIGURE 4;

FIGURE 7 is a left hand end view of the mandrel as shown in FIGURE 4;

FIGURE 8 is a perspective elevational view of a gusseted multi-ply bag constructed in accordance with the present invention;

FIGURE 9 is a plan view of the bag shown in FIGURE 8;

FIGURE 10 is an enlarged sectional view of a corner of the bag shown in FIGURE 8;

FIGURE 11 is a perspective elevational view of a portion of a gusseted bag of the present invention with sections of the outer paper plies removed;

FIGURE 12 is a perspective elevational view similar to FIGURE 11 of a prior art gusseted bag;

FIGURE 13 is a cross-sectional view taken along the line of the seal in the plastic inner liner of a gusseted bag 13—13 of FIG. 11 with the removed sections of the paper plies restored;

FIGURE 14 is a cross-sectional view taken along the line 14—14 of FIG. 12 with the removed sections of the paper plies restored;

Figure 1:
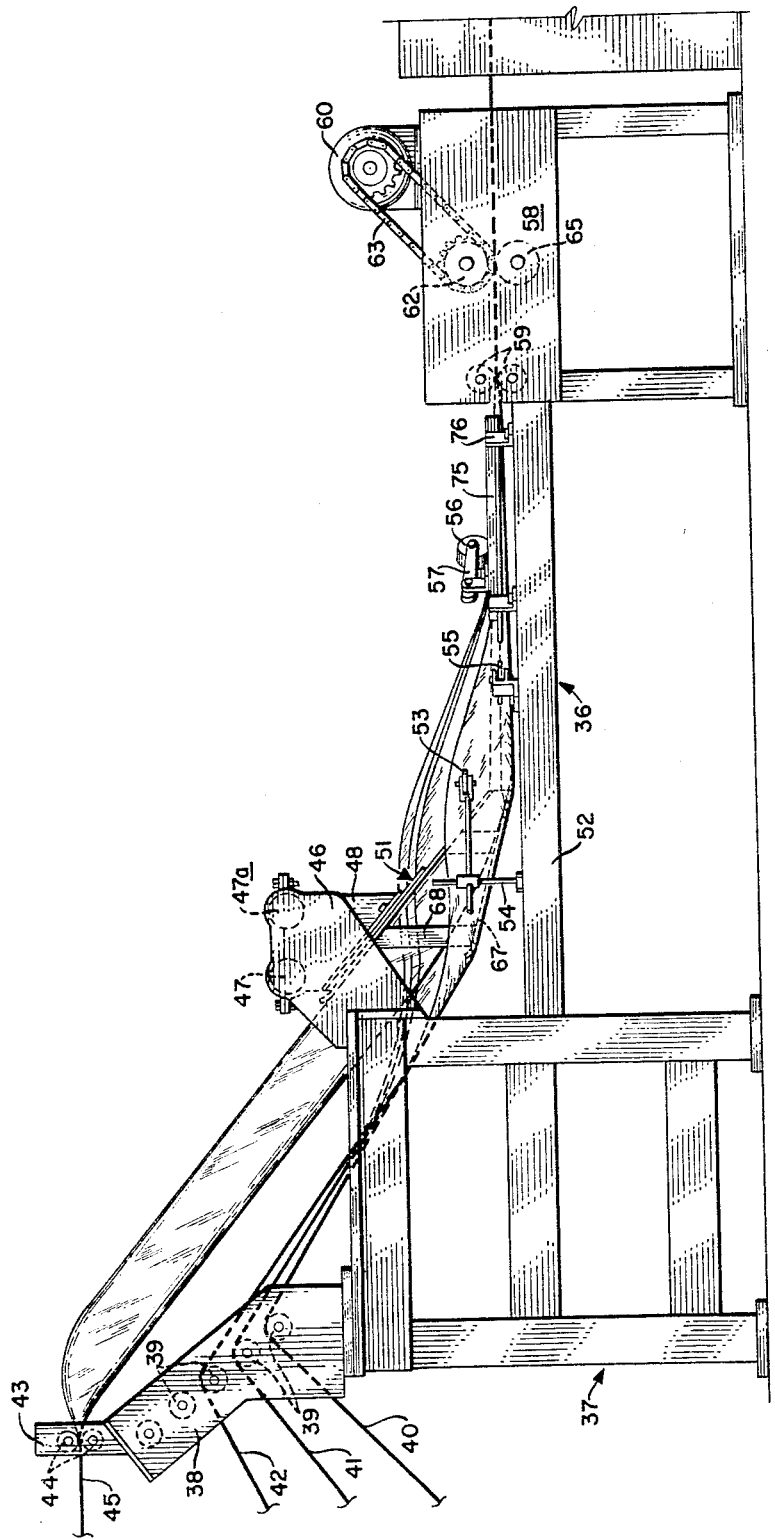
FIGURE 1 is a side elevational view of a portion of a bag-forming apparatus constructed in accordance with the present invention.

Referring now to FIGURES 8, 9, 10, 11, and 13 the gusseted multi-ply bag of the present invention, designated generally by the numeral 20, includes an outer ply of kraft paper 21, or other suitable bag-forming material. Concentrically arranged within the outer ply are the second innermost paper ply 22, third innermost paper ply 23, and the seamless tubular ply of plastic material 24 forming the innermost ply or inner liner of the bag. While the bag illustrated in the drawings includes three paper plies and one plastic ply, it is understood that the gusseted multi-ply bag of the present invention need only include a single outer ply of suitable bag-forming material and an inner ply of plastic seamless tubular material. The gusseted multi-ply bag of the present invention may include any number of intermediate plies between the outermost and the tubular ply forming the inner liner. The preferred material for constructing the outer plies of the gusseted multi-ply bag of the present invention is kraft paper. However, the invention is not limited to the use of such paper, but may employ other materials such as heavy gauge polyethylene plastic or other suitable sheet material capable of being formed into a gusseted multi-ply bag.

Referring to FIGURE 8, the gusseted multi-ply bag has a flat front surface 25 and a flat rear surface 26 connected by gusseted side portions 27. The gusseted side portions 27 of the bag are formed by folding the two opposed side portions of the bag along longitudinally, spaced apart fold lines 28, 29, and 30 into V-shaped gussets. If desired, a plurality of V-shaped gussets can be provided on each side of the bag. The bag 20 is closed at its lower end by means of folded paper tape 31 attached to the bag by means of a line of thread stitching 32. Thread stitching may be the only means used to close the end or ends of the bag, however, for certain uses the bag can be hermetically sealed by welding the walls of the plastic inner liner together. Other methods of sealing the bag of the present invention may be employed, such as by means of a high strength adhesive alone, or in combination with the paper tape 31 and thread stitching 32.

Referring now to FIGURES 8 and 11, in addition to the paper tape 31 and thread stitching 32, the inner ply of plastic material 24 may be hermetically sealed by means of a heat seal 33 provided immediately above the line of thread stitching 32. If desired, the width of the heat seal line 33 may be increased and the line thread stitching 32 placed centrally of the heat sealed line. Additionally, a second heat seal (not shown) may be placed immediately below the line of thread stitching 32 in order to more securely anchor the seamless tubular ply of plastic material 24 to the paper plies of the gusseted bag. It will be understood that the top of the bag is closed in a manner similar to that described herein for the closing of the bottom of the bag when the bag is filled with a product by the customer. However, the gusseted multi-ply bag of the present invention is not limited to open top bags, but encompasses multi-ply bags closed on each end by the manufacturer by sewing, adhesively sealing, heat sealing, individually and in combination, or other suitable means. The gusseted bag of the present invention may be manufactured with valves in the sides thereof for filling.

Referring now more specifically to FIGURE 9, the rear surface of the bag 26 contains the lapped edge portions 34 of the respective paper plies. The lapped edge portions 34 of each of the plies are affixed to each other by means of any suitable strong adhesive (not shown).

Referring now to FIGURE 10 the three paper plies 21, 22 and 23 are arranged in such a manner that they make a face to face contact in the finished bag. The seamless tubular ply of plastic material 24 may have the same circumference and thus be fully supported by paper ply 23 or it may be spaced away from the paper ply 23. The tubular ply of plastic material 24 shown in the particular embodiment of the bag depicted in FIGS. 9 and 10 has a circumference that is smaller than the circumference of the adjacent paper ply 23. Thus when this form of gusseted multi-ply bag of the present invention is fully opened and the tubular ply of plastic material 24 is centered within the outer plies there is provided a free space, designated 35, extending throughout the area defined by the outer surface of the tubular ply of plastic material 24 and the inner surface of the innermost paper ply 23. When this form of gusseted multi-ply bag is filled with a dense particulate material, the tubular ply of plastic material 24 may be extended by stretching until its outer surface is in substantially full contact with the inner surface of the innermost paper ply 23. However, whether the plastic inner ply stretches to contact the inner ply depends upon the density of the loading material and the gauge of plastic material used to form the inner ply. This feature of this form of the multi-ply bag of the present invention increases the strength of the bag by utilizing the elasticity of the plastic material from which the seamless tubular ply of plastic material 24 is constructed. However, when added strength is not required the ply 24 may be light gauge and have the same circumference as paper ply 23. A particularly suitable plastic material for making the seamless tubular ply 24 is polyethylene, since this material has good elasticity, high strength, is economical and can be conveniently fabricated. However, other plastic materials can be utilized to fabricate the seamless tubular plastic inner ply of the gusseted multi-ply bag of the present invention, e.g., polypropylene, polyvinyl chloride, "Pliofilm," cellulose acetate, and other suitable plastic materials.

Referring now to FIGURES 11 and 13, the gusseted multi-ply bag 20 constructed according to the present invention has the transversely extending heat seal 33 positioned slightly above the lower end of the seamless tubular ply of plastic material 24. Each side portion of the plastic inner liner in the area of heat seal has two sealed folded portions 77a and 77b. As seen in FIGURE 13 the folded portions 77a—77a of the plastic inner liner 24 extend into the gusset folds adjacent the flat front surface 25 of the bag and the folded portions 77b—77b extend into the gusset folds adjacent the flat rear surface 26 of the bag. The provision of the folded portions 77a and 77b on each side of the plastic inner liner 24 in the heat seal area permits these generally Y-shaped side portions of the inner liner to fit perfectly into the infolded gusseted side portions 27 of the outer paper plies at the bottom of the bag. Since the heat seal 33 is continuous throughout the two folded portions 77a and 77b and in the area where the folded portions join the seal in the front and back panels of the inner liner, there is no problem of moisture transmission or product sifting through the heat seal area.

The primary advantage realized from the foregoing construction of the inner liner 24 of the present invention is that no undue stress or weakening is produced in the plastic liner adjacent the sealed ends of the bag by the weight of the material with which the bag is filled. The plastic liner has full conformance with and support from the outer paper plies 21, 22 and 23.

Referring now to FIGURES 12 and 14 it will be seen that gusseted paper bags of the prior art do not have the foregoing advantage. The multi-ply gusseted bag 78 utilizes an inner liner of plastic material 79 that has a flat continuous heat seal 80 that extends across the lower end of the liner. Each of the two side portions 81—81 of the inner liner 79 must be received in only one of the two folds in each of the gusseted portions of the outer paper plies at the bottom of the bag. As shown in FIGURE 14 these side portions 81—81 are positioned in the folds adjacent the front surface 82 of the bag. When the bag is sewn along the line 83 (FIGURE 12) the plastic inner liner 79 cannot fit down into the fold of the gussets adjacent the back surface 83 of the bag. When the bag is filled with a particulate material, the weight of the material causes the inner liner to fold back over the V-shaped portion 84 of the side gussets adjacent the sew line 83 in the bottom corners of the bag. Thus the inner liner 79 is not supported by the outer paper plies in these corners which can cause abrasion to weaken or break the plastic liner in these areas permitting moisture to enter the bag interior or allowing the contents of the bag to contact the paper plies and possibly weaken them.

The gusseted multi-ply bag of the present invention can be made in any desired size, limited only by the availability of suitable tubes to form the bag lengths. Conventional tubes are generally adaptable to producing bags of the present invention having lengths from about 20 inches to about 54 inches, widths (excluding gussets) of about 12 inches to about 25 inches, and gusset widths from about 2 inches to about 6 inches. The seamless tubular plastic material for forming the inner ply may be any suitable commercial flat tubing of whatever wall thickness is required by the end use of the bag. Conventional commercial polyethylene flat tubing from about ½-mil gauge to about 2.5-mil gauge has been found suitable. In one specific embodiment of the bag of the present invention the length was 32 inches, the width 15 inches, and the gusset width was 3 inches. The circumference of the paper plies was thus 36 inches. 1.5-mil gauge seamless polyethylene tubing having a circumference of 35½ inches was used for the plastic inner liner. Thus the bag had a free space distance "A" (see FIGURE 10) of 0.16 inch between the inner paper ply 23 and the plastic inner liner 24.

Figure 2:
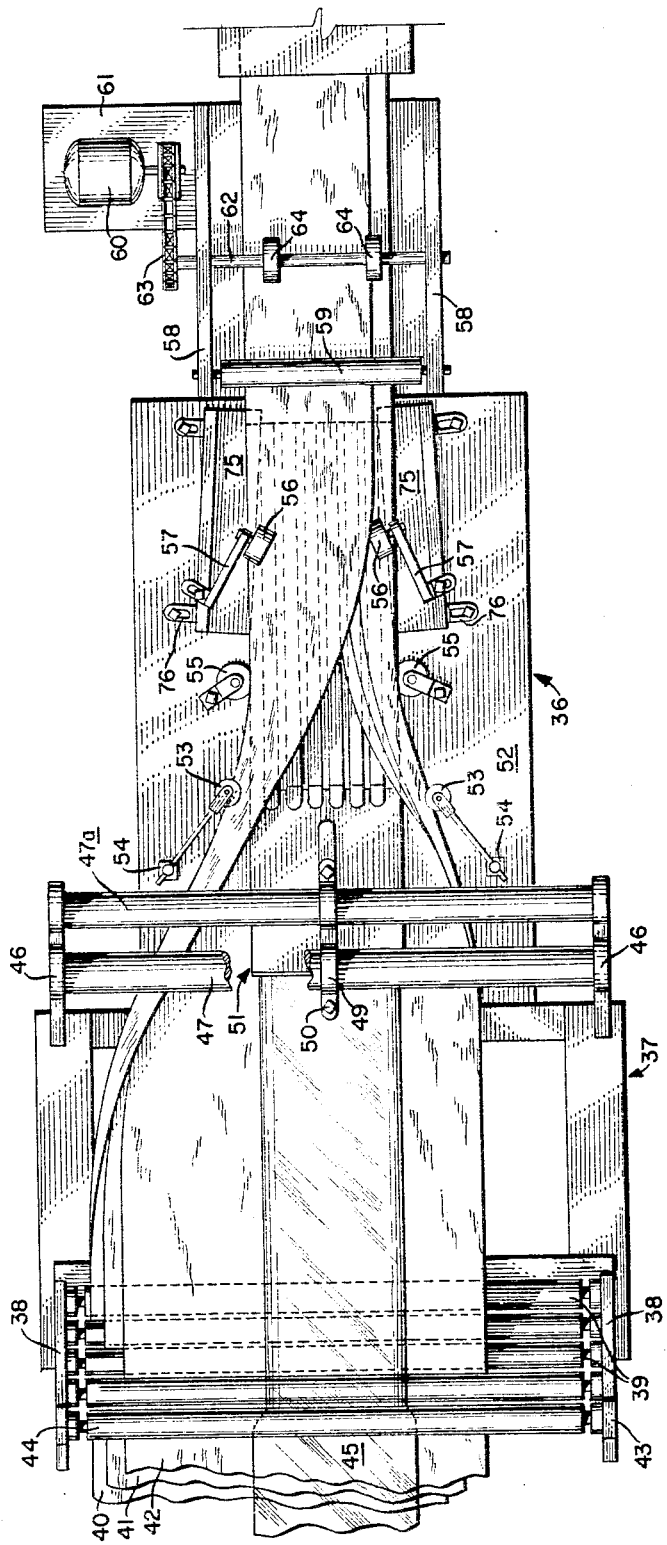
FIGURE 2 is a plan view of the apparatus of FIGURE 1.

Referring now to FIGURES 1 and 2, a portion of a bag-forming apparatus constructed in accordance with the present invention is shown. The bag-forming apparatus is designated generally by the numeral 36. The machine 36 is adapted to receive a plurality of paper webs or other bag-forming material, to bond the webs longitudinally into tubular form, to adhesively secure the edges of each web one to the other and to deliver the bonded webs into a cutting mechanism which severs them into bag lengths. The webs are folded one about the other in nested relationship as they pass through the machine. As can be seen in FIGURE 1, the generally rectangular support frame, designated generally by the numeral 37, has attached at the upper left hand corner a roll support member 38. The support member 38 carries a plurality of guide rollers 39 over which pass the webs of paper which form the plies of the bag. Web 40 forms the outer ply of the multi-ply bag, web 41 forms the second ply, and web 42 forms the third ply. Bracket 43 supports a pair of squeeze rollers 44 mounted at the top of member 38. A flattened tube of seamless plastic material 45, such as polyethylene, passes between the squeeze rollers 44. A support bracket 46 is attached to either side of support frame 37 and extends forward over table 52. Two cylindrical support members 47 and 47a are mounted between the two support brackets 46—46. Bracket 48 is attached to support members 47 and 47a by means of strap 49 and bolts 50. The bag-forming mandrel or former, designated generally by the numeral 51, is attached to the bracket 48. The mandrel 51 is supported entirely by the bracket 48 and is spaced slightly above the surface of the table 52 in order to provide for passage of the webs underneath the mandrel. A roller 53 is mounted on either side of mandrel 51 and is attached to the table 52 by means of a bracket 54. The rollers 53—53 support the paper webs and infold the webs about the mandrel 51 to form the nested tubes. One longitudinal edge of each of the webs 41, 42, and 43 have applied thereto a band of adhesive (not shown) by a series of longitudinal paste applicators (not shown). When the opposed marginal edges of the webs are brought together, as can be seen in FIGURE 2, the adhesive unites these overlapping longitudinal edges to form the webs into a plurality of nested tubes. A wheel 55 is rotatably mounted on table 52 on either side of the mandrel 51. Each wheel 55 is received in an indentation (to be described more fully hereafter) in the mandrel 51 and presses the paper webs into the indentation to form the gussets in the side portions of the paper webs to form the bag stock.

A gusset skid 75 is mounted at each side of the mandrel 51 by means of brackets 76 which support the skids above the surface of the table 52. Each skid is generally rectangular in shape and is positioned to force the nested paper webs firmly into the V-shaped trough in the side portion 74 of the toe portion of the mandrel (see FIGURE 6). An ironing roller 56 is mounted on a bracket 57 affixed to the gusset skid 75 on each side of the former 51. These ironing rollers are set at an angle to the direction of travel of the nested webs to push the infolding paper plies tightly around the exterior surface of the former 51. This keeps the longitudinal edges of the webs from sliding transversely after they are lapped along the portion having the adhesive which forms the longitudinal seams of the bag stock.

The right hand end of table 52 is attached to spaced apart support members 58—58 positioned on either side of the bag stock. A pair of squeeze rollers 59 is rotatably mounted between the two support members. The rollers firmly press the layers of nested paper and the walls of the plastic tube together and provides a substantially air tight seal of the plastic tube. An electric motor 60 is mounted on a shelf 61 which is attached to the left hand support member 58. The motor 60 drives rotatably mounted shaft 62 by means of a chain belt 63. A pair of fixedly mounted drive rollers 64 are attached at spaced intervals to the shaft 62. These rollers press firmly against the flattened paper webs and in turn press the web against support roller 65 which is rotationally mounted between support members 58—58. Rotation of the roller 64 pulls the bag stock, paper webs and plastic tube through the bag-forming apparatus.

Referring now to FIGURES 3 through 7, the bag-forming mandrel 51 has a heel portion which includes a generally rectangular upper plate 66 and a spaced apart lower plate 67. The upper and lower plates are maintained in spaced relationship by means of spaced pairs of forward brackets 68 and rearward brackets 69. The upper plate 66 has attached thereto, by welding or other suitable means, strap 70 which is used to attach the mandrel to the bracket 48 (as can be seen in FIGURES 1 and 2).

The toe portion of mandrel 51 includes a generally rectangular flat top section 71 and a generally rectangular flat bottom section 72. Both the top section and bottom section of the mandrel have affixed thereto spaced apart, longitudinally extending ribs 73. The ribs 73 may be attached to the top and bottom sections of the mandrel by welding or any other suitable means. Each side portion 74 of the mandrel 51 has the form of a V-shaped trough whose depth increases moving towards the smaller end of the toe of the mandrel.

The mandrel 51 is preferably formed from sheet metal of such a gauge as to be sufficiently rigid yet which can be bent conveniently to provide the V-shaped side portions. The heel portion of the mandrel may be fabricated separately and attached to the toe portion by welding or other suitable means. However, the heel and toe portion of the mandrel may be fabricated from a unitary piece of metal if desired.

Referring more particularly to FIGURES 1 and 2, the process of the present invention is conducted by advancing the outer ply web 40, second ply web 41, third ply web 42, and flattened tube of seamless plastic material 45 through the bag-forming apparatus 36. The paper webs and the tube of plastic material are drawn from rolls (not shown) supported by suitable roll stands (not shown). As seen in FIGURE 2, the various webs are fed through the bag-forming machine in the conventional transversely stepped alignment to prevent contact between the longitudinally extending glue strips (not shown) on the edge of each one of the webs. A paste applying mechanism (not shown) applies the longitudinally aligned strip of adhesive to the upper surface of the webs 40, 41 and 42, respectively, on the side having the step-up alignment. A transversely extending line of adhesive is applied to each of the webs by a spot paster mechanism (not shown). These lines of adhesive join the individual webs together at intervals slightly less than the length of an individual bag. The line of adhesive on the top surface of the third ply web 42 is applied in the form of a line of dots 85 and joins the tubular ply of seamless plastic material 24 to the third ply web 42 adjacent each end of a bag length, as can be seen in FIGURE 8.

The paper plies 40, 41 and 42 pass over guide rollers 39 and are brought into contact with each other at the forward edge of the lower plate 67 of the heel portion of the mandrel 51. The webs pass under the downward sloping lower plate 67 of the mandrel and contact the ribs 73 on the bottom section of the toe portion of the mandrel. The outer edge portions of the webs 40, 41 and 42 are folded inwardly by opposed rollers 53 on each side of the mandrel 51. Rotating opposed rollers 55 press the nested webs into the V-shaped side portion 74 of the mandrel to provide crease lines 28, 29 and 30 which provide the gussets in the side portion of the multi-ply bag 20. The gusset skids 75 on each side press the webs tightly into the V-shaped side portion 74 to complete the formation of the gussets in the bag stock. Ironing rollers 56 complete the infolding of side portions of the webs 40, 41 and 42.

The ribs 73 on the top 71 and bottom 72 surfaces of mandrel 51 are spaced apart a distance sufficient to permit an individual dot of adhesive on the inner surface of web 42 to pass therebetween without being wiped off. The ribs are of a sufficient thickness to prevent the dots of adhesive contacting the upper or lower surface of the toe portion of the mandrel.

The portion of the tube of seamless plastic material 45 extending between the set of squeeze rollers 44 and squeeze rollers 59 contains a trapped air bubble which expands that portion of the plastic tube. The air bubble may be placed in that portion of the plastic tube between the rollers by means of compressed air fed into that portion of the tube after the bag-forming machine is threaded up with paper webs and the seamless plastic tube 45. However, since it is possible that some portion of the air entrapped may leak before the completion of the run, provision can be made for supplying additional compressed air to the inflated section while the bag-forming run is in progress. This can conveniently be done by placing a floating compressed air cylinder (not shown) equipped with an automatic pressure regulator valve inside the inflated portion of the seamless plastic tube 45.

The inflated portion of the seamless plastic tube 45 passes into the mouth formed by the upper and lower plates 66 and 67 forming the heel portion of the mandrel. The cylindrical inflated plastic tube 45 is flattened gradually by the converging surfaces of the upper and lower plates. The pair of opposed forward brackets 68 guide the tube as it passes between the upper and lower plates. The semi-flattened plastic tube 45 then passes into the interior of the toe portion of mandrel 51. The air pressure inside the inflated portion of the plastic tube forces the side portions of the tube to conform to the V-shaped interior side walls 74 of the toe portion of the mandrel. Thus, the plastic tube has fold lines formed in its side portions which correspond and register with the fold lines providing the gussets in the side of the paper webs. When the gusseted plastic tube 45 passes out the end of the toe of the mandrel, it mates exactly with the gusseted paper webs. Squeeze rollers 59 also serve as final flattening rollers to form the bag stock into its final shape. Drive rollers 64 carry the bag stock forward to a cutting apparatus (not shown) where it is severed into bag lengths. The separate bag lengths are then fed to a heat sealing machine if it is desired to provide a hermetic seal of the tubular ply of plastic material 24. The bag lengths are then moved through a sewing machine where the paper tape 31 and line of stitching 32 close the lower end of the bag. The steps of heat sealing and sewing may be reversed if desired. Suitable apparatus for heat sealing and sewing to close the ends of the bag lengths is described in U.S. Patent 3,097,618, the disclosure of which is incorporated herein by reference.

Figure 15:
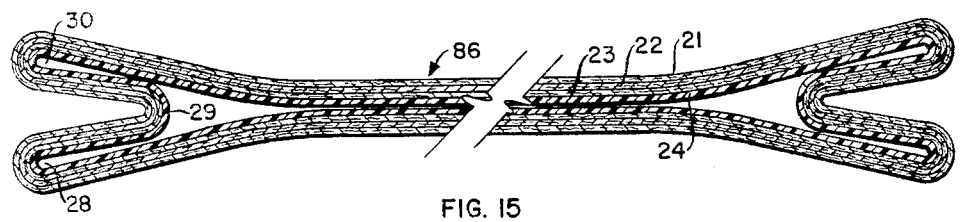
FIGURE 15 is a cross-sectional view of a gusseted multi-ply bag length of the present invention.
Figure 16:
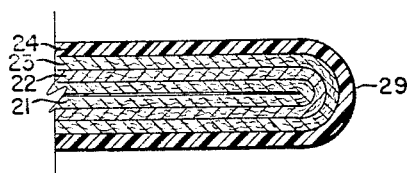
FIGURE 16 is an enlarged fragmentary cross-sectional view of the fold in the plies at the bottom of the V-shaped gusset in the bag length of FIGURE 15.

From the foregoing description of the process and apparatus for making the gusseted bag lengths of the present invention, it can be seen that the inner ply of seamless tubular plastic material is not subjected to any sharp creasing in conjunction with heat and/or pressure along the fold lines which form the gussets in the plastic material. Referring to FIGURE 15, a cross section is depicted of a bag length 86 of the present invention cut from the bag stock after passing through the squeeze rollers 59 into a cutoff machine (not shown). Since the inner ply of seamless tubular plastic material 24 has been only lightly pressed against the interior surface of the hollow mandrel 51 by the low pressure air in the inflated section of the plastic material, no sharp creases a formed along the fold lines 28, 29 and 30 in the inn ply on each side of the bag length. As seen in FIGUR 16, the enlarged cross section of the bag length alor the fold line 29 in the area of the apex of the V-shap gusset depicts how the plastic inner liner 24 makes arcuate fold which has a radius equal to the combine thickness of the three outer plies 21, 22, and 23 plus tl thickness of the plastic material 24. With this radius fold there is no tendency to produce a crack or sco line along the fold line 29 which would weaken the pla tic material along this line. Thus the plastic materi has a strength in this fold line equal to that of the fl front and back portions of the plastic material. Whi the plastic material 24 is folded back on itself along tl fold lines 28 and 30 in the top of the gusset on each sic these folds are not subjected to any great pressure or any frictionally generated heat and therefore have strength along these fold lines equal to that of the fl front and back portions of the plastic material. Tht when the bag length 86 is finished into a bag and fille the flexing of the plastic inner liner along the fold lin 28, 29 and 30 produced by handling and transporti the bag does not result in cracking the liner wall alo these lines.

Figure 17:
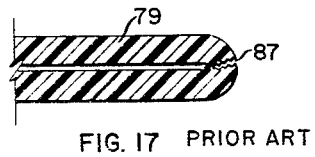
FIGURE 17 is an enlarged fragmentary cross-sectional view of the fold in a plastic inner liner of a prior art gusseted bag.
Figure 18:
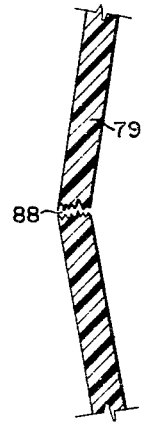
FIGURE 18 is an enlarged fragmentary cross-sectional view of plastic inner liner of FIGURE 17 after the fold is opened.

Referring now to FIGURE 17, an enlarged portion the plastic inner liner 79 of the prior art gusseted bag (FIGURE 12) has a crack 87 along the fold line at t apex of the V-shaped gusset. This liner is cracked being run between the former or mandrel undersurfa and the outer plies of paper where it is subjected to bc high pressure causing a severe crease to be formed alo the fold lines and to frictionally generated heat whi further weakens the plastic material along the fold lin When the bag 78 is filled, the gusseted portion of t liner 79 is folded out (as seen in FIGURE 12). Handli and transporting the bag produces flexing of the plas material along the fold line which can produce a co plete break 88 in the inner liner 79, as shown in FI URE 18.

As pointed out hereinbefore, the gusseted multi-ply t of the present invention is a definite improvement o those available heretofore. The feature that may be e bodied in one form of bag of present invention wher the tubular polyethylene liner has a smaller circumf ential dimension than the exterior paper plies provi a bag which has higher bursting strength than the c ventional bags wherein the polyethylene liner has same dimension circumferentially as the exterior pa plies. Additionally, the gusseted multi-ply bag provi a bag having a tubular polyethylene liner which conta no longitudinal seam on one side thereof as contrasted the multi-ply bags made by wrapping a flat film of pc ethylene about the exterior of a mandrel and subsequer either welding or gluing a longitudinal seam to form closed tube. The inner liner of the present bag is weakened along the fold lines which form the gus: and thus provides a higher strength inner liner and which is less susceptible to leakage.

The bag-forming apparatus of the present invent provides a means of producing gusseted plastic li bags at a high speed with commensurate savings in of production. The novel bag-forming mandrel utili in the apparatus of the present invention provides a me of gusseting a seamless tubular polyethylene liner w simultaneously gusseting the outer paper plies of the stock. The construction of the mandrel permits tubular polyethylene liner to be run through the t forming machine at high speed without tearing or dan ing the liner.

The process of the present invention provides ad\ tages in that it permits the fabrication of gusseted m ply bags using conventional tubing machines, con tional paper stock and readily available flat folded se less polyethylene tube stock. The process permits gusseted bags to be manufactured with a savings over methods previously known to the art.

While there has been described what is at present considered preferred embodiments of the present invention, it will be apparent to those skilled in the art that various modifications and changes may be made without departing from the essence of the invention. It is intended to cover herein all such modifications and changes as come within the true scope and spirit of the claims.

What is claimed is:

1. In a gusseted multi-ply bag the combination comprising:
   (a) an outer ply of sheet material in the form of a flattened tube having a front and back surface;
      (i) said flattened tube having longitudinally extending, spaced apart fold lines on each side thereof along which the side portions of said tube are infolded to provide at least one generally V-shaped gusset in each of the side portions of said tube;
   (b) an inner, seamless tubular ply of plastic material, having substantially the same length as said outer ply, received in and conforming to the shape of said outer ply,
      (i) said inner, seamless tubular ply of plastic material being transversely closed at one end thereof, said closure extending along the double folded portions in each side portion of said plastic material where said plastic extends into the gussets of said outer ply to provide a closure and having a cross-sectional shape of a Y at each side portion; and
   (c) common closure means for said inner ply and said outer ply adjacent one end of said bag.

2. In a gusseted multi-ply bag the combination comprising:
   (a) a plurality of nested, tubular concentrically arranged outer plies of sheet material,
      (i) said plies being in the form of flattened tubes having front, back and side surfaces;
      (ii) said flattened tubes having longitudinally extending, spaced apart fold lines on each side thereof along which the side portions of said tube are infolded to provide at least one generally V-shaped gusset in each of the side portions of said tube;
   (b) an inner, seamless tubular ply of plastic material received in and conforming to the shape of said outer plies of sheet material;
      (i) said inner, seamless tubular ply of plastic material being transversely sealed adjacent one end thereof, said seal extending along the double folded portions in each side portion of said plastic material where said plastic material extends into the gussets of said outer plies to provide a seal having a cross-sectional shape of a Y at each side portion; and
   (c) means closing the end of the bag having the seal.

3. The combination set forth in claim 2 wherein said plurality of nested, tubular, concentrically arranged outer plies of sheet material are fabricated from paper.

4. In a gusseted multi-ply bag the combination comprising:
   (a) a plurality of nested, tubular, concentrically arranged outer plies of paper,
      (i) said plies being in the form of flattened tubes having front, back and side surfaces;
      (ii) said flattened tubes having longitudinally extending, spaced apart fold lines on each side thereof along which the side portions of said tube are infolded to provide at least one generally V-shaped gusset in each of the side portions of said tube;
   (b) an inner, seamless tubular ply of plastic material received in and conforming to the shape of said outer paper plies,
      (i) said inner, seamless tubular ply of plastic material being transversely heat sealed adjacent one end thereof, said heat seal extending along the double folded portions in each side portion of said plastic material where said plastic material extends into the gussets of said outer plies to provide a seal having a cross-sectional shape of a Y at each side portion; and
   (c) thread stitching closing the end of the bag having said heat seal.

5. The combination set forth in claim 4 wherein the thread stitching is positioned below the upper longitudinal marginal limit of the heat seal in said plastic material, and the circumference of said inner, seamless tubular ply of plastic material is substantially equal to or less than the circumference of each of said outer plies of paper.

References Cited by the Examiner
UNITED STATES PATENTS

| | | | |
|---|---|---|---|
| 2,751,140 | 6/1956 | Brady | 229—55 |
| 2,790,592 | 4/1957 | Doyle et al. | 229—55 |
| 2,896,516 | 7/1959 | Tilton et al. | 93—8 |
| 2,929,544 | 3/1960 | Herschler | 229—55 |
| 3,058,647 | 10/1962 | Reiselt | 229—55 |
| 3,183,797 | 5/1965 | Boone | 93—8 |

GEORGE O. RALSTON, *Primary Examiner.*

DAVID M. BOCKENEK, *Examiner.*